(12) United States Patent
Yang et al.

(10) Patent No.: US 8,786,441 B2
(45) Date of Patent: Jul. 22, 2014

(54) RADIO FREQUENCY IDENTIFICATION TAG

(75) Inventors: Yong Suk Yang, Daejeon (KR); In-Kyu You, Daejeon (KR); Jae Bon Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 425 days.

(21) Appl. No.: 13/307,023

(22) Filed: Nov. 30, 2011

(65) Prior Publication Data

US 2012/0139558 A1   Jun. 7, 2012

(30) Foreign Application Priority Data

Dec. 1, 2010   (KR) .................... 10-2010-0121450

(51) Int. Cl.
| | | |
|---|---|---|
| G08B 13/14 | (2006.01) | |
| G01R 27/26 | (2006.01) | |
| G06K 19/07 | (2006.01) | |
| G06K 19/077 | (2006.01) | |
| G06K 17/00 | (2006.01) | |
| G08B 13/24 | (2006.01) | |

(52) U.S. Cl.
CPC ...... *G06K 19/0723* (2013.01); *G06K 19/07773* (2013.01); *G06K 19/0725* (2013.01); *G06K 17/0029* (2013.01); *G08B 13/2434* (2013.01)
USPC ...... 340/572.1; 324/686; 324/663; 340/572.7

(58) Field of Classification Search
USPC ........... 324/649, 600, 750.15, 537, 501, 500; 340/572.1, 572.4, 568.1, 10.1, 10.4; 455/41.1, 41.2, 500
See application file for complete search history.

(56) References Cited

U.S. PATENT DOCUMENTS

| | | | | |
|---|---|---|---|---|
| 6,104,311 | A * | 8/2000 | Lastinger | 340/10.51 |
| 7,102,520 | B2 * | 9/2006 | Liu et al. | 340/572.1 |
| 7,158,037 | B2 * | 1/2007 | Forster et al. | 340/572.8 |
| 7,683,785 | B2 * | 3/2010 | Johnson | 340/572.1 |
| 7,986,234 | B2 | 7/2011 | Fukuda | |
| 8,072,333 | B2 * | 12/2011 | Ferguson et al. | 340/572.7 |
| 2007/0035387 | A1 * | 2/2007 | Forster | 340/447 |
| 2007/0229281 | A1 * | 10/2007 | Shionoiri et al. | 340/572.7 |

FOREIGN PATENT DOCUMENTS

| | | | |
|---|---|---|---|
| KR | 2006-0039927 A | 5/2006 | |
| KR | 2008-0048143 A | 6/2008 | |
| KR | 2009-0092548 A | 9/2009 | |

* cited by examiner

*Primary Examiner* — Hoai-An D Nguyen
(74) *Attorney, Agent, or Firm* — Rabin & Berdo, P.C.

(57) ABSTRACT

Provided is a radio frequency identification (RFID) tag. The RFID tags includes: a conductive layer and a conductive line disposed above and below an insulation layer, respectively; an antenna connected to one end of the conductive line; a resistor connected to the other end of the conductive line; a first conductive plate connected to the conductive line and constituting a first capacitor in conjunction with the conductive layer and the insulation layer; and a first sensing device connected between the conductive line and the conductive layer and having an impedance changed according to a sensing of a first target material.

11 Claims, 7 Drawing Sheets

RADIO FREQUENCY IDENTIFICATION TAG

CROSS-REFERENCE TO RELATED APPLICATIONS

This U.S. non-provisional patent application claims priority under 35 U.S.C. §119 of Korean Patent Application No. 10-2010-0121450, filed on Dec. 1, 2010, in the Korean Intellectual Property Office (KIPO), the entire contents of which are hereby incorporated by reference.

BACKGROUND OF THE INVENTION

The present invention disclosed herein relates to a radio communication, and more particularly, to a radio frequency identification (RFID) tag.

A radio frequency identifier is a contactless identification system exchanging information by using a radio frequency between an RFID reader and RFID tag. The RFID reader transmits signal toward the RFID tag. The RFID tag receives the signal transmitted from the RFID reader. The RFID tag modulates the received signal and retransmits the modulated signal to the RFID reader. The RFID reader performs a subsequent operation according to the modulated signal received from the RFID tag.

The RFID is largely classified into an active RFID method and a passive RFID method. According to the active RFID method, the RFID tag includes power. The RFID tag operations using a built-in power. According to the passive RFID method, the RFID tag include no additionally power. The RFID reader supplies energy to the RFID tag without contact. The RFID tad operates using the energy supplied from the RFID reader.

The passive RFID method includes a mutual induction method and an electromagnetic method. The mutual induction method is typically used in a lower frequency RFID. According to the mutual induction method, the RFID reader transmits energy of a magnetic field to the RFID tag. According to the electromagnetic method, the RFID reader transmits energy of an electromagnetic wave to the RFID tag.

SUMMARY OF THE INVENTION

The present invention provides a radio frequency identification (RFID) tag having low complexity.

Embodiments of the present invention provide radio frequency identification (RFID) tags including: a conductive layer and a conductive line disposed above and below an insulation layer, respectively; an antenna connected to one end of the conductive line; a resistor connected to the other end of the conductive line; a first conductive plate connected to the conductive line and constituting a first capacitor in conjunction with the conductive layer and the insulation layer; and a first sensing device connected between the conductive line and the conductive layer and having an impedance changed according to a sensing of a first target material.

In some embodiments, the first conductive plate and the first sensing device may be connected to the conductive line at a first point between one end and the other end of the conductive line.

In other embodiments, the first sensing device may include: a first electrode connected to a first point of the conductive line; a second electrode connected to the conductive line through a contact plug penetrating the insulation layer; and a sensing material disposed between the first and second electrodes and having an impedance changed according to the sensing of the first target material.

In still other embodiments, the RFID tags may further include: a first protective layer covering the conductive layer; and a second protective layer disposed on the antenna, the conductive line, the resistor, and the first sensing device and exposing the sensing material.

In even other embodiments, the sensing material may have a resistance value changed according to the sensing of the first target material.

In yet other embodiments, the sensing material may have a permittivity changed according to the sensing of the first target material.

In further embodiments, when the first target material is not sensed by the first sensing device, impedances of the first capacitor and the first sensing device may be set to allow a reflectance at the first point of the conductive line to be the maximum.

In still further embodiments, a distance from the antenna to the first point of the conductive line may be k times (k is an integer greater than 0) of a wavelength of a radio frequency used in the RFID tag.

In even further embodiments, a distance from the antenna to the first point of the conductive line may be k times (k is a reciprocal of the square number of 2) of a wavelength of a radio frequency used in the RFID tag.

In yet further embodiments, the RFID tags may further include: a second conductive plate connected to a second point of the conductive line disposed in an opposite direction of the antenna based on the first point of the conductive line and constituting a second capacitor in conjunction with the conductive layer and the insulation layer; and a second sensing device connected between the second point of the conductive line and the conductive layer and having an impedance changed according to a sensing of a second target material.

In yet further embodiments, when the second target material is not sensed by the second sensing device, impedances of the second capacitor and the second sensing device may be set to allow a reflectance at the second point of the conductive line to be the maximum.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
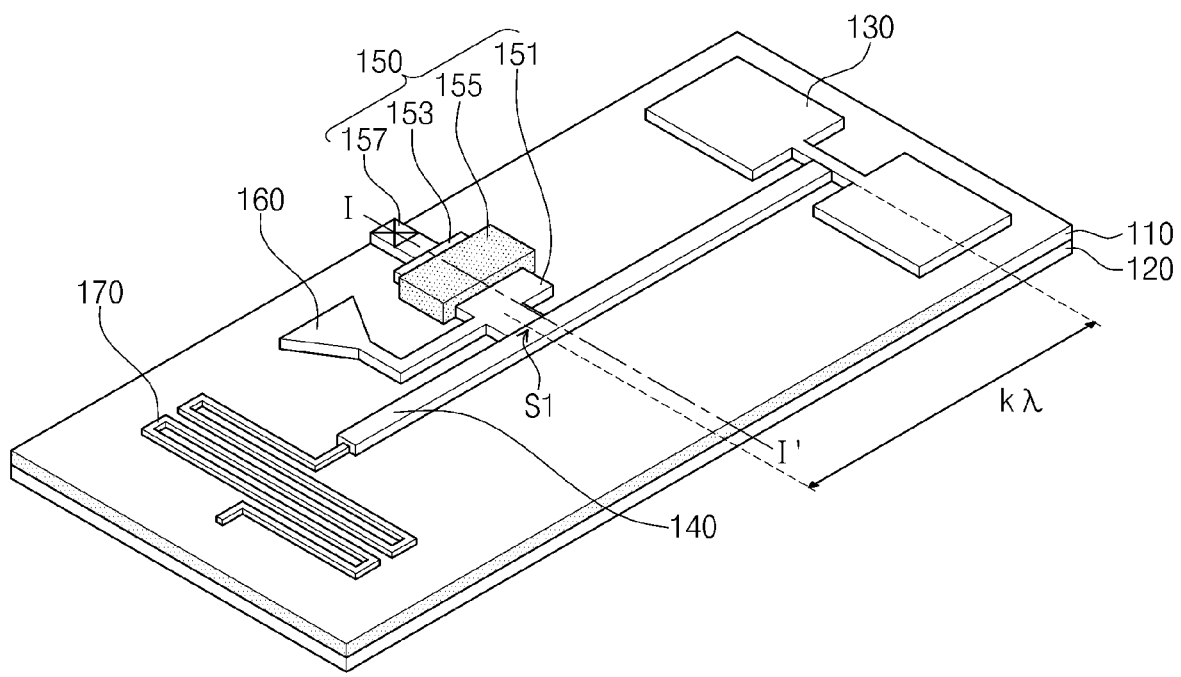
FIG. 1 is a perspective view illustrating a radio frequency identification (RFID) tag according to a first embodiment of the present invention.
Figure 2:
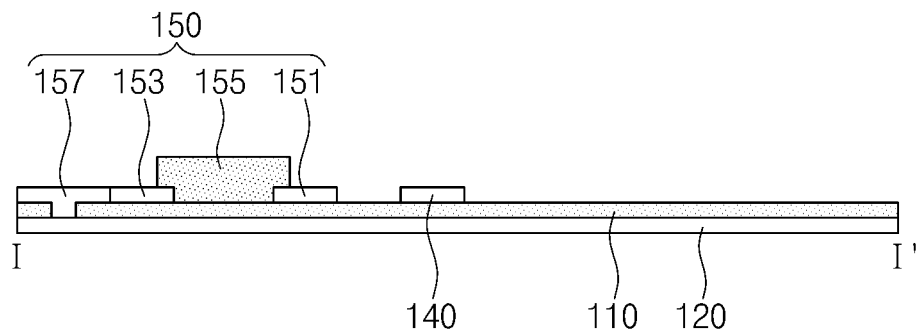
FIG. 2 is a sectional view taken along the line I-I' of FIG. 1.

FIG. 1 is a perspective view illustrating a radio frequency identification (RFID) tag 100 according to a first embodiment of the present invention. FIG. 2 is a sectional view taken along the line I-I' of FIG. 1. Referring to FIGS. 1 and 2, an insulation layer 110 is provided. Exemplarily, the insulation layer 110 may include glass, plastic, and paper. The insulation layer 110 may be a flexible substrate.

A conductive layer 120 is formed below the insulation layer 110. The conductive layer 120 may operate as a ground node of the RFID tag 100.

An antenna 130 is formed on the insulation layer 110. Exemplarily, the antenna 130 may be an antenna corresponding to a frequency of 13.56 MHz. The antenna 130 may be an antenna corresponding to a frequency of 900 MHz.

A first conductive line 140 is formed on the insulation layer 110. One end of the first conductive line 140 is connected to the antenna 140. The first conductive line 140, the insulation layer 110, and the conductive layer 10 constitute a micro strip line.

A first sensing device 150 is provided. The first sensing device 150 is connected to a first point S1 of the first conductive line 140. The first sensing device 150 includes a first electrode 151 connected to the first point S1 of the first conductive line 140, a second electrode 153 connected to the conductive layer 120 through a contact plug 157, and a sensing material between the first and second electrodes 151 and 154.

The sensing material 155 has impedance changed according to a sensing of a target material. For example, when a target material such as specific chemicals, bio materials, toxic gas, and carbon dioxide is sensed, an impedance of the sensing material 155 is changed.

Exemplarily, when a target material is sensed, a conductivity of the sensing material 155 may be changed. That is, the sensing material 155 may operate as a variable resistor between the first and second electrodes 151 and 153. When a target material is sensed, a permittivity of the sensing material 155 may be changed. That is, the sensing material 155 and the first and second electrodes 151 and 153 may constitute a variable capacitor. When a target material is sensed, a conductivity and a permittivity of the sensing material 155 may be changed together.

A first conductive plate 160 connected to the first point S1 of the first conductive line 140 is formed on the insulation layer 110. The first conductive plate 160, the insulation layer 110, and the conductive layer 120 may constitute a first capacitor.

A second conductive line 170 connected to the other end of the first conductive line 140 is formed on the insulation layer 110. The second conductive line 170 may constitute a resistor. The second conductive line 170 may operate as an absorbing terminal absorbing a radio wave transmitted through the microstrip line formed of the first conductive line 140, the insulation layer 110, and the conductive layer 120.

Exemplarily, the conductive layer 120, the antenna 130, the first conductive line 140, the sensing device 150, a first conductive plate 160, and the second conductive line 170 may be formed through a printing process. That is, the conductive layer 120, the antenna 130, the first conductive line 140, the sensing device 150, the first conductive plate 160, and the second conductive line 170 may consist of a printing circuit ink. The conductive layer 120, the antenna 130, the first conductive line 140, the sensing device 150, the first conductive plate 160, and the second conductive line 170 may include silver (Ag).

Exemplarily, a distance between one end of the first conductive line 140 connected to the antenna 130 and the first point S1 of the first conductive line 140 to which the first sensing device 150 and the first conductive plate 160 are connected is k times of a wavelength ($\lambda$) of a radio frequency used in the RFID tag 100. k is an integer greater than 0. k is a reciprocal of a square root of 2.

Figure 3:
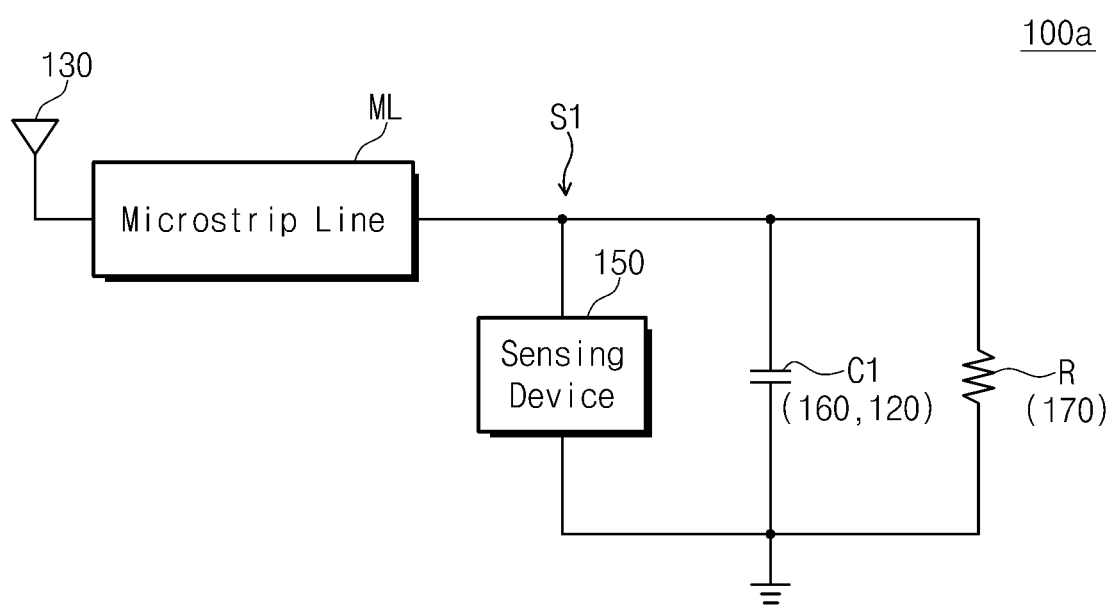
FIG. 3 is a circuit diagram illustrating an equivalent circuit of the RFID tag described with reference to FIGS. 1 and 2.

FIG. 3 is a circuit diagram illustrating an equivalent circuit 100a of the RFID tag described with reference to FIGS. 1 and 2. Referring to FIGS. 1 through 3, the antenna 130 is connected to the first conductive line 140. The first conductive line 140, the insulation layer 110, and the conductive layer 120 constitute a micro strip line ML.

The first sensing device 150 and the first conductive plate 160 are connected to the first point S1 of the first conductive line 140. The first sensing device 150 is connected to the conductive layer 120 operating as a ground node through the contact plug 157. The first conductive plate 160 and the conductive layer 120 operating as a ground node constitute a first capacitor C1. That is, the first sensing device 150 and the first capacitor C1 are defined to be connected in parallel between the microstrip line ML and the ground node.

The second conductive line 170 operating as a resistor R is connected to the other end of the first conductive line 140.

The first sensing device 150 has an impedance changed according to the sensing of a target material. Exemplarily, in a normal state with no target material, in order for a signal received through the antenna 130 to have the maximum reflectance reflected at the first point S1, impedances of the first sensing device 150 and the first capacitor C1 are set. When a target material is sensed, an impedance of the first sensing device 150 is changed. An impedance of the first sensing device 150 is changed according to a value corresponding to the maximum reflectance. That is, when a target material is sensed, reflectance is reduced than a normal state.

Figure 4:
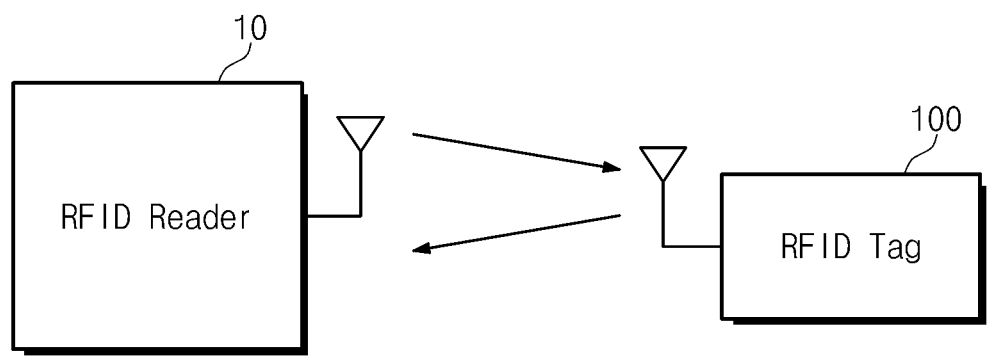
FIG. 4 is a block diagram illustrating an RFID system according to embodiments of the present invention.

FIG. 4 is a block diagram illustrating an RFID system according to embodiments of the present invention. Referring to FIG. 4, an RFID reader 10 and an RFID tag 100 are shown. The RFID reader 10 transmits a transmission signal to the RFID tag 100. The RFID tag 100 reflects some of an electromagnetic wave transmitted from the RFID reader 100 and absorbs the remaining. An amount of a reflected wave reflected by the RFID tag 100 is determined by a reflectance of the RFID tag 100.

Figure 5:
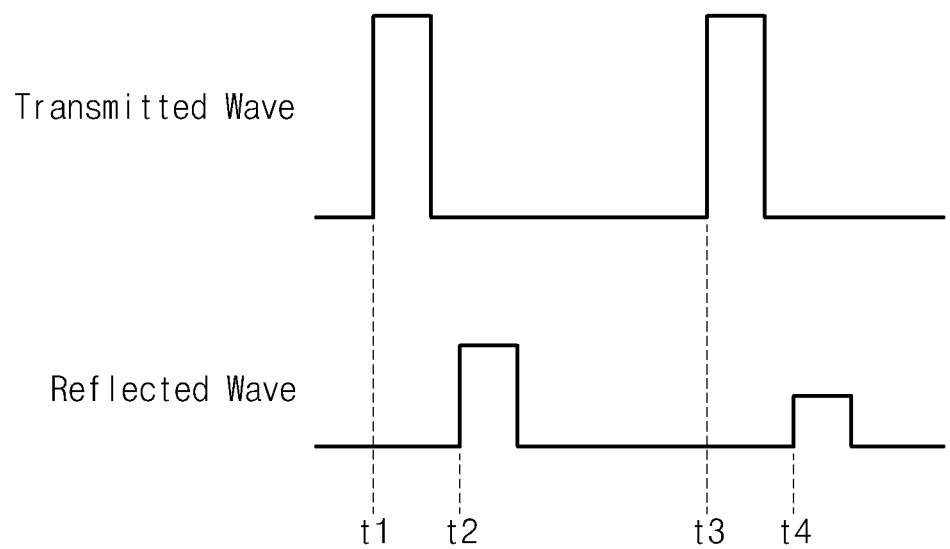
FIG. 5 is a timing diagram illustrating a transmission wave and a reflected wave transmitted in the RFID system of FIG. 4.

FIG. 5 is a timing diagram illustrating a transmission wave and a reflected wave transmitted in the RFID system of FIG. 4. Referring to FIGS. 3, 4, and 5, the RFID reader 10 transmits a transmission wave to the RFID tag 100 at the first timing t1. The RFID tag 100 transmits a reflected wave to the RFID reader 10 at the second timing t2.

Exemplarily, at the second timing t2, it is assumed that the RFID tag 100 is in a normal state. That is, at the second timing t2, it is assumed that a target material corresponding to the sensing material 155 (refer to FIGS. 1 and 2) is not sensed. At this point, a reflectance of the RFID tag 100 is the maximum.

At the timing t3, it is assumed that the RFID reader 10 re-transmits a transmission wave to the RFID 100. At the fourth timing t4, the RFID tag 100 transmits a reflected wave to the RFID reader 10.

Exemplarily, at the timing t4, it is assumed that the RFID tag 100 senses a target material. At this point, the first sensing device 150 has an impedance changed from an impedance of a normal state. As an impedance of the first sensing device 150 is changed, reflectance is reduced than a normal state. That is, an amplitude of a reflected wave transmitted at the fourth timing t4 is less than that transmitted at the second timing t2.

The RFID reader 10 determines whether a target material is sensed by the RFID tag 100 based on an amplitude of the reflected wave received from the RFID tag 100. Exemplarily, when an amplitude of the reflected wave received from the RFID tag 100 is more than a threshold voltage, the RFID reader 10 determines that data 1 is received from the RFID tag 100. When the data 1 is received from the RFID tag 100, the RFID reader 10 determines that a target material is not sensed by the RFID tag 100. For example, based on the reflected wave received at the second timing t2, the RFID reader 10 may determine that a target material is not sensed.

When an amplitude of the reflected wave received from the RFID tag 100 is lower than a threshold voltage, the RFID reader 910 determines that data 1 is received from the RFID tag 100. When the data 0 is received from the RFID tag 100, the RFID reader 10 determines that a target material is sensed by the RFID tag 100. For example, based on the reflected wave received at the fourth timing t4, the RFID reader 10 determines that a target material is sensed.

As mentioned above, the RFID tag 100 according to an embodiment of the present invention adjusts reflectance according to a sensing of a target material, so that it transmits data to the RFID reader 10. According to an embodiment of the present invention, the RFID tag 100 may be a chipless RFID tag that does not requires a semiconductor substrate and a semiconductor chip. The chipless RFID tag according to an embodiment of the present invention may be manufactured through a printing process. Accordingly, the chipless RFID tag having low complexity and manufactured with reduced price may be provided.

Figure 6:
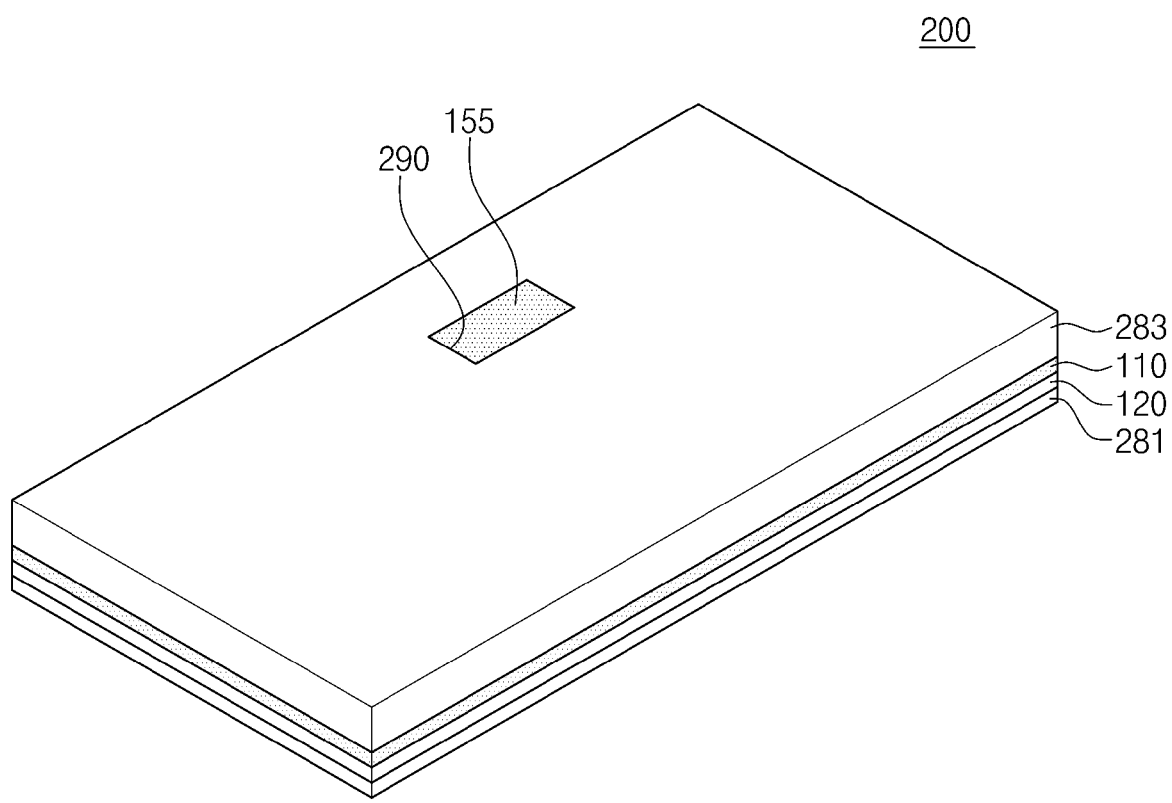
FIG. 6 is a view illustrating an RFID tag with an added protective layer.

FIG. 6 is a view illustrating an RFID tag 200 with an added protective layer. Compared to the RFID tag 100 of FIG. 1, a first protective layer 281 is formed below a conductive layer 120. The first protective layer 281 may include an insulation material such as glass, plastic, and paper.

A second protective layer 283 is provided on an antenna 130, a first conductive line 140, a first sensing device 150, a first conductive plate 160, and a second conductive line 170. An exposure hole 290 is provided in the second protective layer 283. The exposure hole 290 exposes a sensing material 155 of the first sensing device 150. That is, all components except the sensing material 155 among the components of FIG. 1 are isolated from the external by the first and second protective layers 151 and 152.

For convenience of description, sides of the insulation layer 110 and the conductive layer 120 are shown between the first and second protective layers 281 and 283. However, the first and second protective layers 281 and 283 expand to have a larger area than the insulation layer 110 and the conductive layer 120. That is, sides of the insulation layer 110 and the conductive layer 120 are also isolated from the external by the first and second protective layers 281 and 283.

Figure 7:
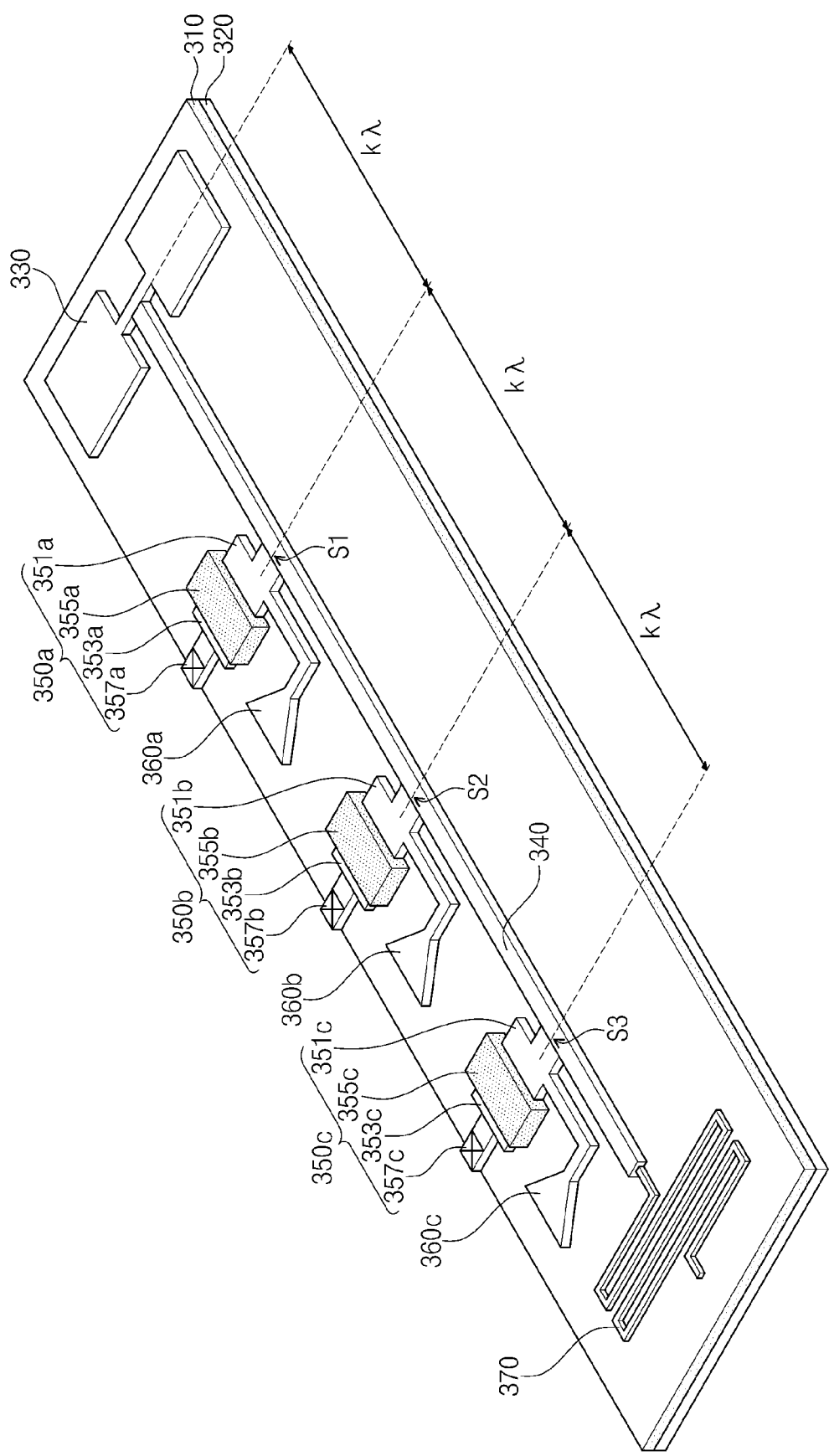
FIG. 7 is a perspective view illustrating an RFID tag according to a second embodiment of the present invention.

FIG. 7 is a perspective view illustrating an RFID tag 300 according to a second embodiment of the present invention. Referring to FIG. 7, an insulation layer 310 and a conductive layer 320 are formed. An antenna 330 and a first conductive line 340 are formed on the insulation layer 310. One end of the first conductive line 340 is connected to the antenna 330 and the other end is connected to the second conductive line 370.

A first sensing device 350a and a first conductive plate 360a are connected to a first point S1 of the first conductive line 340. The first sensing device 350a has the same structure as the first sensing device 150 described with reference to FIG. 1. The first conductive plate 360a has the same conducive plate 160 described with reference to FIG. 1.

A second sensing device 350b and a second conductive plate 360b are connected to a second point S2 of the first conductive line 340. The second sensing device 350b has the same structures as the first sensing device 150 described with reference to FIG. 1. The second conductive plate 360b has the same structure as the conductive plate 160 described with reference to FIG. 1.

A third sensing device 350c and a third conductive plate 360c are connected to a third point S3 of the first conductive line 340. The third sensing device 350c has the same structures as the first sensing device 150 described with reference to FIG. 1. The third conductive plate 360c has the same structure as the conductive plate 160 described with reference to FIG. 1.

Except that the second and third sensing devices 350b and 350c and the second and third conductive plates 360b and 360c are formed at the second and third points S2 and S3 of the first conductive line 340, the RFID tag 300 has the same structure as the RFID tag 100 described with reference to FIG. 1.

A distance between the antenna 330 and the first point S1 of the first conductive line 340 is k times of a wavelength λ of a radio frequency. A distance between the first and second points S1 of the first conductive line 340 is k times of a wavelength λ of a radio frequency. A distance between the second and third points S2 and S3 of the first conductive line 340 may be k times of a wavelength λ of a radio frequency. k is an integer greater than 0. k is a reciprocal of a square number of 2.

Figure 8:
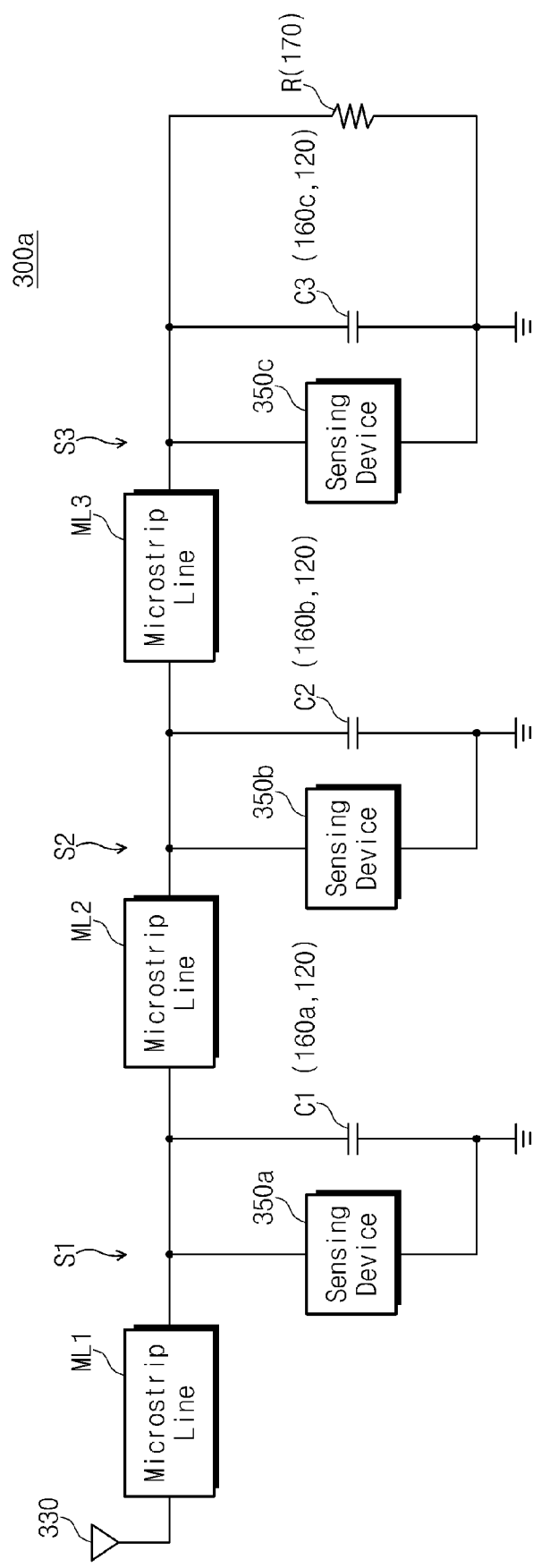
FIG. 8 is a circuit diagram illustrating an equivalent circuit of the RFID tag of FIG. 7.
Figure 9:
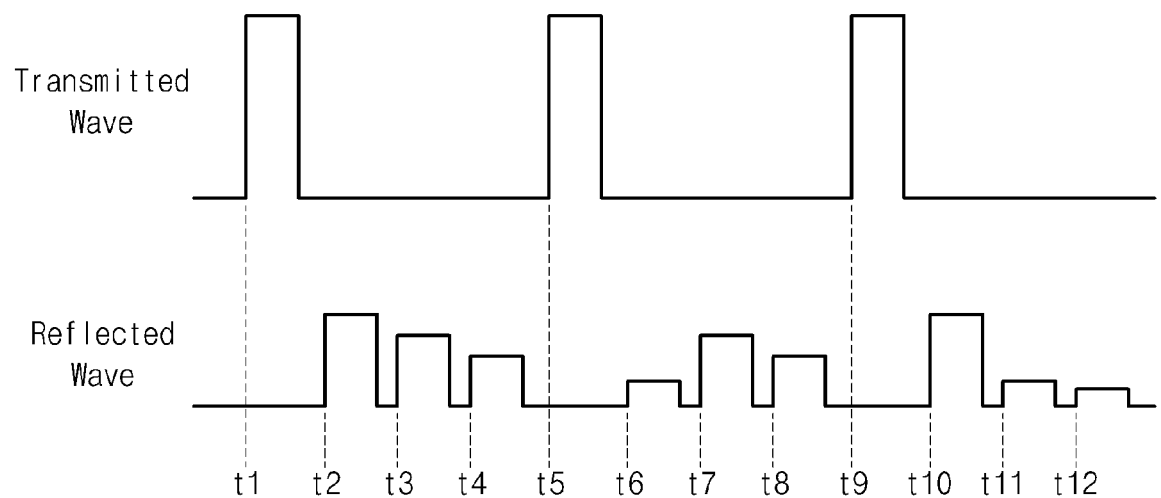
FIG. 9 is a timing diagram illustrating a transmission wave received in the RFID tag of FIG. 8 and an occurring reflected wave.

FIG. 8 is a circuit diagram illustrating an equivalent circuit 300a of the RFID tag 300 of FIG. 7. Referring to FIGS. 8 and 9, the antenna 330 is connected to the first conductive line 340. The first conductive line 340 and the conductive layer 320 constitute a microstrip line ML.

The micro strip line ML is defined to be divided into first to third portions ML1 to ML3 by the first to third points S1 to S3. Exemplarily, a portion of the first conductive line 340 between the antenna 130 and the first point S1 corresponds to the first portion ML1 of the micro strip line ML. A portion of the first conductive line 340 between the first point S1 and the second point S2 corresponds to the second portion ML2 of the micro strip line ML. A portion of the first conductive line 340 between the second point S2 and the third point S3 corresponds to the third portion ML3 of the microstrip line ML.

The first sensing device 350a and the first conductive plate 360a are connected to the first point S1. The first sensing device 350a is connected to the conductive layer 320 operating as a ground node through a contact plug 357a. The first conductive plate 360a and the conductive layer 320 operating as a ground node constitute a first capacitor C1. That is, the first sensing device 350 and the first capacitor C1 are defined to be connected in parallel between the micro strip line ML and the ground node.

A radio wave transmitted to the first point S1 through the microstrip line ML is reflected and transmitted based on the impedances of the first sensing device 350*a* and the first capacitor C1. The first sensing device 350*a* has an impedance changed according to the sensing of a target material. Exemplarily, in a normal state with no target material detected, the impedances of the first sensing device 350*a* and the first capacitor C1 are adjusted to maximize reflectance. When a target material is sensed, an impedance of the first sensing device 350*a* is changed. That is, when a target material is sensed, the reflectance according to the first sensing device 350*a* and the first capacitor C1 is reduced than a normal state. Once the reflectance according to the first sensing device 350*a* and the first capacitor C1 is reduced, an amount of a radio wave reflected at the first point S1 and an amount of a transmitted radio wave are changed.

The second sensing device 350*b* and the second conductive plate 360*a* are connected to the second point S2. The second sensing device 350*b* is connected to the conductive layer 320 operating as a ground node through the contact plug 357*b*. The second conductive plate 360*b* and the conductive layer 320 operating as a ground node constitute a second capacitor C2. That is, the second sensing device 350*b* and the second capacitor C2 are defined to be connected in parallel between the microstrip line ML and the ground node.

A radio wave transmitted to the second point S2 through the microstrip line ML is reflected and transmitted based on the impedances of the second sensing device 350*b* and the second capacitor C2. The second sensing device 350*b* has an impedance changed according to the sensing of a target material. Exemplarily, in a normal state with no target material detected, the impedances of the second sensing device 350*b* and the second capacitor C2 are adjusted to maximize reflectance. When a target material is sensed, an impedance of the second sensing device 350*b* is changed. That is, when a target material is sensed, the reflectance according to the second sensing device 350*b* and the second capacitor C2 is reduced than a normal state. Once the reflectance according to the second sensing device 350*b* and the second capacitor C2 is reduced, an amount of a radio wave reflected at the second point S2 and an amount of a transmitted radio wave are changed.

The third sensing device 350*c* and the third conductive plate 360*c* are connected to the third point S3. The third sensing device 350*c* is connected to the conductive layer 320 operating as a ground node through the contact plug 357*c*. The third conductive plate 360*c* and the conductive layer 320 operating as a ground node constitute a third capacitor C3. That is, the third sensing device 350*c* and the third capacitor C3 are defined to be connected in parallel between the micro strip line ML and the ground node.

A radio wave transmitted to the third point S3 through the microstrip line ML is reflected and transmitted based on the impedances of the third sensing device 350*c* and the third capacitor C3. The third sensing device 350*c* has an impedance changed according to the sensing of a target material. Exemplarily, in a normal state with no target material detected, the impedances of the third sensing device 350*c* and the third capacitor C3 are adjusted to maximize reflectance. When a target material is sensed, an impedance of the third sensing device 350*c* is changed. That is, when a target material is sensed, the reflectance according to the third sensing device 350*c* and the third capacitor C3 is reduced than a normal state. Once the reflectance according to the third sensing device 350*c* and the third capacitor C3 is reduced, an amount of a radio wave reflected at the third point S3 and an amount of a transmitted radio wave are changed.

A second conductive line 370 operating as a resistor R is connected to the other end of the first conductive line 340.

The first to third sensing devices 350*a* to 350*c* include first to third sensing materials 355*a* to 355*c*, respectively. The first to third sensing materials 355*a* to 355*c* correspond to respectively different target materials. That is, the impedances of the first to third sensing materials 355*a* to 355*c* are changed according to respectively different target materials. The materials detected by the first to third sensing materials 355*a* to 355*c* are defined to be first to third target materials, respectively.

According to whether the first target material is sensed by the first sensing material 355*a*, reflectance at the first point S1 is reduced. According to whether the second target material is sensed by the second sensing material 355*b*, reflectance at the second point S2 is reduced. According to whether the third target material is sensed by the third sensing material 355*c*, reflectance at the third point S3 is reduced.

That is, the RFID reader 10 (refer to FIG. 4) senses reflected waves reflected at the first to third points S1 to S3 of the RFID tag 300, so that it is determined whether the first to third target materials 355*a* to 355*c* are sensed or not.

The reflected waves reflected at the first to third points S1 to S3 of the RFID tag 300 are transmitted with a time difference according to a speed of a radio wave transmitted through the micro strip line ML. The speed of a radio wave transmitted through the microstrip line ML may be defined as the following Equation 1.

$$V = \frac{L}{T} = \frac{c}{\varepsilon_r^{\frac{1}{2}}}$$ [Equation 1]

where V is the speed of a radio wave transmitted, L is the distance of the microstrip line ML, T is the consumed time of a radio wave transmitted, c is the speed of line, i.e., $3 \times 10^8$ m/x, and $\varepsilon_r$ is the dielectric constant of the insulation layer 110.

Exemplarily, it is assumed that the dielectric constant of the insulation layer 110 is about 2.8 similar to that of paper. It is assumed that a distance between the antenna 330 and the first point S1 of the first conductive line 340, a distance between the first and second points S1 and S2 of the first conductive line 340, and a distance L between the second and third points S2 and S3 are about 65 mm each. At this point, a consumed time that a radio wave transmitted to the three portions ML1, ML2, and ML3 of the microstrip line ML is about 362 ps. A consumed round-trip time that a radio wave travels back and forth between the starting point and the three portions ML1, ML2, and ML3 of the microstrip line ML is about 724 ps.

Hereinafter, it is assumed and described that the consumed time that a radio wave is transmitted to the three portions ML1, ML2, and ML3 of the micro strip line ML is about 362 ps.

FIG. 9 is a timing diagram illustrating a transmission wave received in the RFID tag 300 of FIG. 8 and an occurring reflected wave. Referring to FIGS. 8 and 9, a transmission wave is received in the RFID tag 300 at the first timing t1.

After about 362 ps from the first timing t1, a transmission wave passes through the first portion ML1 of the micro strip line ML to reach the first point S1. At the first point S1, a first reflected wave is generated according to whether a first target material is sensed or not. The generated first reflected wave is reflected to the first portion ML1 of the micro strip line ML. The first transmitted wave is transmitted into the second portion ML2 of the micro strip line ML.

At the second timing t2 after about 724 ps from the first timing t1, the first reflected wave passing through the first portion ML1 of the microstrip line ML is transmitted through the antenna 330. Additionally, the first transmitted wave reaches the second point S2 through the second portion ML2 of the microstrip line ML. At the second point S2, a second reflected wave is generated according to the first target material is sensed or not. The generated second reflected wave is reflected to the second portion ML2 of the micro strip line ML. The second transmitted wave is transmitted to the third portion ML3 of the microstrip line ML.

After about 362 ps from the second timing t2, the second reflected wave passes through the second portion ML2 of the micro strip line ML2 to reach the first point S1. The second reflected wave is transmitted to the first portion ML1 of the microstrip line ML. Additionally, the second transmitted wave passes through the third portion ML3 of the micro strip line ML to reach the third point S3. At the third point S3, according to whether a third target material is sensed or not, a third reflected wave is generated. The generated third reflected wave is reflected to the third portion ML3 of the micro strip line ML. The third transmitted wave is absorbed in a resistor R.

At the third timing t3 after about 724 ps from the second timing t2, the second reflected wave passing through the first portion ML1 of the micro strip line ML is transmitted through the antenna 330. The third reflected wave passes through the third portion ML3 of the microstrip line ML to be delivered to the second portion ML2 of the micro strip line ML.

After about 362 ps from the third timing t3, the third reflected wave passes through the second portion ML2 of the microstrip M to be delivered to the first portion ML1 of the micro strip line ML.

At the fourth timing t4 after about 724 ps from the third timing t3, the third reflected wave passes through the first portion ML1 of the micro strip line ML to be transmitted through the antenna 330.

That is, when one transmitted wave is delivered to the RFID tag 300, the first to third reflected waves representing whether third target materials are sensed at about 724 ps intervals. If about 724 ps are converted into a frequency, it corresponds to about 1.4 GHz. That is, the RFID tag 300 operates in a radio frequency band based on backscattering.

Exemplarily, it is assumed that the reflected waves occurring at the second to fourth times t2 to t4 occur in a normal state with no target material sensed.

At the fifth timing t5, a transmitted wave is received in the RFID tag 300. At the sixth timing t6 after about 724 ps from the fifth timing t5, the first reflected wave is transmitted. An amount of the first reflected wave transmitted at the sixth timing t6 is less than that transmitted at the second timing t2. That is, it is determined that the first target material is sensed by the first sensing device 350a.

At the seventh timing t7 after about 724 ps from the sixth timing t6, the second reflected wave is transmitted. An amount of the second reflected wave transmitted at the seventh timing t7 is less than that transmitted at the third timing t3. That is, it is determined that the second target material is not sensed by the second sensing device 350b.

At the eighth timing t8 after about 724 ps from the seventh timing t7, the third reflected wave is transmitted. An amount of the third reflected wave transmitted at the eighth timing t8 is less than that transmitted at the third timing t3. That is, it is determined that the third target material is not sensed by the third sensing device 350c.

At the ninth timing t9, a transmitted wave is received in the RFID tag 300. At the tenth timing t10 after about 724 ps from the ninth timing t5, the first reflected wave is transmitted. An amount of the first reflected wave transmitted at the tenth timing t10 is less than that transmitted at the second timing t2. That is, it is determined that the third target material is not sensed by the first sensing device 350a.

At the eleventh timing t11 after about 724 ps from the tenth timing t10, the second reflected wave is transmitted. An amount of the second reflected wave transmitted at the eleventh timing t11 is less than that transmitted at the third timing t3. That is, it is determined that the second target material is sensed by the second sensing device 350b.

At the twelfth timing t12 after about 724 ps from the eleventh timing t11, the third reflected wave is transmitted. An amount of the third reflected wave transmitted at the twelfth timing t12 is less than that transmitted at the fourth timing t4. That is, it is determined that the third target material is sensed by the third sensing device 350c.

As mentioned above, the RFID tags 100, 200, and 300 according to the embodiments of the present invention adjusts an amount of a reflected wave according to whether a target material is sensed or not. The RFID tags 100, 200, and 300 may be formed based on a chipless through a printing process. Therefore, according to the present invention, an RFID tag operating in a radio frequency and having low complexity may be provided.

According to the present invention, provided is an RFID tag in which backscattering effect is changed by impedance changed according to the sensing of a target material. Therefore, an RFID tag having low complexity is provided.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A radio frequency identification (RFID) tag comprising:
   a conductive layer and a conductive line disposed above and below an insulation layer, respectively;
   an antenna connected to one end of the conductive line;
   a resistor connected to the other end of the conductive line;
   a first conductive plate connected to the conductive line and constituting a first capacitor in conjunction with the conductive layer and the insulation layer; and
   a first sensing device connected between the conductive line and the conductive layer and having an impedance changed according to a sensing of a first target material.

2. The RFID tag of claim 1, wherein the first conductive plate and the first sensing device are connected to the conductive line at a first point between one end and the other end of the conductive line.

3. The RFID tag of claim 1, wherein the first sensing device comprises:
   a first electrode connected to a first point of the conductive line;
   a second electrode connected to the conductive line through a contact plug penetrating the insulation layer; and
   a sensing material disposed between the first and second electrodes and having an impedance changed according to the sensing of the first target material.

4. The RFID tag of claim 3, further comprising:
   a first protective layer covering the conductive layer; and a second protective layer disposed on the antenna, the conductive line, the resistor, and the first sensing device and exposing the sensing material.

5. The RFID tag of claim 4, wherein the sensing material has a resistance value changed according to the sensing of the first target material.

6. The RFID tag of claim 4, wherein the sensing material has a permittivity changed according to the sensing of the first target.

7. The RFID tag of claim 2, wherein, when the first target material is not sensed by the first sensing device, impedances of the first capacitor and the first sensing device are set to allow a reflectance at the first point of the conductive line to be the maximum.

8. The RFID tag of claim 2, wherein a distance from the antenna to the first point of the conductive line is k times (k is an integer greater than 0) of a wavelength of a radio frequency used in the RFID tag.

9. The RFID tag of claim 2, wherein a distance from the antenna to the first point of the conductive line is k times (k is a reciprocal of the square number of 2) of a wavelength of a radio frequency used in the RFID tag.

10. The RFID tag of claim 2, further comprising:
a second conductive plate connected to a second point of the conductive line disposed in an opposite direction of the antenna based on the first point of the conductive line and constituting a second capacitor in conjunction with the conductive layer and the insulation layer; and
a second sensing device connected between the second point of the conductive line and the conductive layer and having an impedance changed according to a sensing of a second target material.

11. The RFID tag of claim 10, wherein, when the second target material is not sensed by the second sensing device, impedances of the second capacitor and the second sensing device are set to allow a reflectance at the second point of the conductive line to be the maximum.

* * * * *